Patented Aug. 7, 1951

2,563,797

UNITED STATES PATENT OFFICE 2,563,797

CHLORINATION OF ACETIC ACID

Pieter Lucas Stedehouder, Deventer, Netherlands, assignor to Koninklijke Industrieele Maatschappij Voorheen Noury & Van Der Lande, N. V., Deventer, Netherlands, a corporation of the Netherlands No Drawing. Application April 25, 1949, Serial No. 89,561. In the Netherlands May 7, 1948

13 Claims. (Cl. 260—539)

Monochloroacetic acid is a valuable product which finds many applications, in particular in organic synthesis. The hitherto known methods of preparing it were, however, not very satisfactory in practice. It appears that a well-known chemical factory in Germany employed a procedure which required heating for 70 hours. The yield was then 93%. According to Kharash and Brown (J. Am. Chem. Soc. 62 (1940), pages 925 &c.) a maximum yield of 50% was attained when adding sulphuryl chloride as such with a little peroxide as a catalyst. In accordance with the present invention heating is needed for only about 8 hours, and the yield is about as high as that in the German process mentioned above. The present process has the additional advantage that no difficultly handled substances like sulphuryl chloride are employed, but only substances which are conveniently obtained and stored and readily available everywhere.

In accordance with the present invention acetic acid is chlorinated by passing chlorine together with sulfur dioxide into it, and one or more substances are present (dissolved or roughly dispersed) in the acetic acid, which promote the formation of sulphuryl chloride from sulfur dioxide and chlorine by catalytic action. Thus, activated carbon, camphor, nitrogen bases and mercaptans in particular have proved effective catalysts.

In the literature the application of nitrogen bases and mercaptans in the preparation of sulphuryl chloride as such have not heretofore been described. It is true that Kharash and co-operators (J. Am. Chem. Soc. 62 (1940), page 2394) assumed the possibility that these compounds would favor cleavage of sulphuryl chloride to give sulfur dioxide and chlorine, which assumption was sustained later by Helberger (see: Möllering and Lüttgen, Sulfohalogenierung und Sulfohalogenide (1942), page 13, first paragraph).

By my researches I have found that it is readily possible to prepare sulphuryl chloride (as such) by passing sulfur dioxide and chlorine into a vessel which already contains a small amount of sulphuryl chloride with a little pyridine dissolved therein, or also by passing a mixture of sulfur dioxide and chlorine through or over heated pyridine. Primary, secondary and tertiary amines proved also effective catalysts. Dimethylaniline deserves to be mentioned, in particular. Heterocyclic nitrogen compounds all gave good results. Quinoline and piperidine, for example, proved equally as active as pyridine. Mercaptans also gave good yields.

The use of carbon and camphor as catalysts for preparing sulphuryl chloride (as such) from sulfur dioxide and chlorine is described in literature.

It should be noted that from U. S. Patent 2,046,090 the treatment of fatty acids with a mixture of sulfur dioxide and chlorine is known. According to said patent hypochlor sulfurous chloride having the formula

is formed and this compound is said to admit of being added to hydrocarbons and fatty acids, in which connection especially higher fatty acids are apparently contemplated, while splitting off HCl.

It appears, however, that in the absence of a catalyst promoting the formation of sulfuryl chloride, a mixture of sulfur dioxide and chlorine will not or at least not considerably attack acetic acid.

In practice of the invention, no sulfochlorination of the acetic acid takes place, or at the most only in a trifling degree.

In the present process it appears immaterial whether the reaction mass is subjected to light, during the treatment.

Although both concentrated acetic acid and acetic anhydride are mentioned in literature as catalysts promoting the formation of sulphuryl chloride from sulfur dioxide and chlorine, there is practically no reaction if chlorine and sulfur dioxide are passed into pure concentrated acetic acid or into concentrated acetic acid in which acetic anhydride is dissolved. Apparently, the catalytic action of these compounds is too small.

Below 60° C. the velocity of chlorination is too small for practical application. Heating up to 100° to 115° C., is the most preferable condition. A higher temperature is permissible but not efficient since, in that case, a more vigorous cooling is needed to condense vapors evolved and return them into the reaction vessel (i. e. reflux). This disadvantage would be the more objectionable if the temperature would rise to the boiling point of acetic acid which, therefore, preferably, must be avoided.

It has proved possible to add more chlorine than sulfur dioxide, for example five (5) times as much chlorine (by volume), without any considerable amount of passing out from the reaction mixture. Ratios of chlorine to sulfur dioxide (both in the gaseous condition) are stated by volume, throughout the case.

In addition, I have found that the content of chlorine in the gas mixture could advantageously be raised during the course of the reaction. For example, the ratio of chlorine to sulfur dioxide could be 3:1 during the first hour, and 10:1 afterwards.

As a rule, an effective amount of catalyst is between 0.05 and 1% by weight. Larger amounts up to 5% can be used. Technical pyridine bases are cheap catalysts which are very satisfactory in actual practice. Many of the catalysts mentioned will be chlorinated themselves, but the chlorination products are also effective as catalysts. This follows also from the fact that the same quantity of catalyst may be employed more than once without the yield of monochlor-acetic acid being diminished.

The acetic acid must preferably contain little or no water. To combine with the water in the reaction mixture, a small portion of organic acid chloride or acid anhydride may be added, with preference the chloride or anhydride of acetic acid itself. The acetic anhydride is to be preferred above acetyl chloride which boils at 51°-52° C. and, consequently, might cause trouble if the reaction mixture is heated up too rapidly.

Sulfur dioxide and hydrogen chloride are evolved from the reaction mixture, i. e. are in the gases leaving the reaction vessel. The hydrogen chloride may be made into a fairly concentrated aqueous hydrochloric acid by washing the gases with a limited amount of water. The sulfur dioxide only dissolves in a small measure and most of it can, therefore, be recovered and used again.

Generally speaking, the velocity of chlorine introduction must be so chosen that this will all or nearly all be reacted during the process. When applying a properly predetermined excess of chlorine, however, the sulfur dioxide withdrawn from the reaction may be recovered almost completely in the form of $SO_2Cl_2$. This compound condenses by cooling of the gases coming from the reaction vessel. In that case continuous care should be taken that no large amounts of either free chlorine nor sulfur dioxide are contained in the gas leaving the reaction vessel.

With a view to its many possibilities of application, in most factories, $SO_2Cl_2$ will be considered as a valuable by-product of the process.

The mixture may be stirred during the reaction. In large scale production in particular, this may be profitable. Other measures may also be taken to attain a proper distribution of the gases throughout the liquor, for example, passing the gas mixture into the liquor at several places, or taking care that it becomes finely divided when entering into the liquor (e. g. introduced through small perforations).

The invention will now be illustrated by the following examples representing some special embodiments but it will be understood that its scope is not to be limited by these procedures.

Example 1

A mixture of equal parts by volume of chlorine and sulfur dioxide was introduced by means of a gas distributor into a mixture of 600 parts by weight of acetic acid (100%) and 3 parts by weight of pyridine (0.5%) at 100° C., at such a speed that after 8 hours 750 parts by weight of chlorine had been introduced. The cylindrical glass reaction flask was provided with a proper reflux condenser.

Upon rectifying the reaction mixture, a yield of 804 parts by weight of monochlor-acetic acid was obtained, boiling point 187-189° C. In addition, 82 parts by weight of acetic acid was recovered.

Example 2

Chlorinate precisely as in Example 1.

The monochlor-acetic acid may be isolated by cooling the reaction mixture, e. g. for 24 hours at 15° C., whereby the monochloro-acetic acid mostly crystallizes and can be vacuum-filtered. This procedure offers the advantage that the mother liquor which still contains the catalyst can be chlorinated anew after adding fresh acetic acid, by introducing chlorine and sulfur dioxide, without requiring the addition of a fresh quantity of pyridine or other catalyst.

Example 3

A mixture of chlorine and sulfur dioxide in a ratio of 4:1 by volume was passed into a mixture of 600 parts by weight of acetic acid (98.9%), 40 parts by weight of acetic anhydride and 3 parts by weight of technical pyridine bases at 105-110° C., at such a speed that after 7 hours 720 parts by weight of chlorine had been introduced.

The apparatus was provided with a reflux cooler connected with a fairly long downward condenser chilled with ice water. In this manner 171 parts by weight of sulphuryl chloride were condensed from the unabsorbed gases. The separation can be performed as per Example 1 or Example 2.

The yield of monochlor-acetic acid was 788 parts by weight, while 91 parts by weight of acetic acid were recovered.

Example 4

In a cylindrical glass reaction flask provided with a reflux cooler of fairly large capacity, a mixture of chlorine and sulfur dioxide was bubbled into a mixture of 600 parts by weight of acetic acid (98.9%), 40 parts by weight of acetic anhydride and 3 parts by weight of technical pyridine bases at 110-115° C. while stirring. During the first hour, the proportion of the gases was $3Cl_2:1SO_2$ by volume, thereafter it was 10:1. The total time of reaction was 8 hours, during which period 730 parts by weight of chlorine and 87 parts by weight of $SO_2$ were introduced.

Upon rectifying the reaction mixture the yield was 885 parts by weight of monochlor-acetic acid and 62 parts by weight of acetic acid.

Example 5

A mixture of chlorine and sulfur dioxide in a ratio of 3:1 was fed to a mixture of 200 parts by weight of acetic acid (100%) and 1 part by weight of dimethyl aniline at 105-110° C. Time of reaction was 6 hours, the quantity of chlorine introduced was 230 parts by weight.

After being left to stand for 24 hours at room temperature, the crystallized monochlor-acetic acid was sharply vacuum-filtered which yielded 227 parts by weight of a product with a melting point of 60-62.5° C. This product contains 97.3% by weight of monochloroacetic acid.

The mother liquor contained 52 parts by weight of monochlor-acetic acid, and could be reused after adding more acetic acid.

Example 6

In a mixture of 150 parts by weight of acetic acid (99.7%), 2 parts by weight of acetyl chloride and 1 part by weight of technical pyridine bases, a mixture of chlorine and sulfur dioxide in a ratio of 4Cl₂:1SO₂ was introduced.

The initial temperature was 60° C. and the speed of gas was rather low. After half an hour the temperature was raised gradually until it reached 110° C., after one and a half hours. The feeding speed of gas was also further increased until only a very small portion of the chlorine was present in the gas leaving the absorption vessel. The experiment was finished after 8 hours in total. 161 parts by weight of chlorine then had been introduced.

The reaction mixture was fractionated, yielding 192 parts by weight of monochlor-acetic acid.

*Example 7*

Analogous to Example 6, but instead of 2 parts by weight of acetyl chloride, 3.6 parts by weight of benzoyl chloride were added and the temperature was raised at once to 105–110° C. The yield was 202 parts by weight of monochlor-acetic acid.

Benzoyl chloride has no direct effect on the chlorination process but it is only added for eliminating water present in the acetic acid used. An advantage of benzoyl chloride in comparison with acetyl chloride used in Example 6, is that it is less volatile.

*Example 8*

A mixture of chlorine and sulfur dioxide in a ratio of 2:1 by volume was introduced into a mixture of 600 parts by weight of acetic acid (98.9%), 40 parts by weight of acetic anhydride for binding water and 8 parts by weight of camphor at 110–115° C. After 7 hours, when 586 parts by weight of chlorine had been introduced, the mixture was fractionated and 692 parts by weight of monochloracetic acid were obtained.

*Example 9*

In a stirred mixture of 600 parts by weight of acetic acid (100%) and 3.5 parts by weight of activated carbon ("Norit" powder) at a temperature of 105–115° C. a mixture of chlorine and sulfur dioxide was introduced. During the first half hour the ratio was 2:1 by volume, thereafter the ratio was 10:1 by volume. The time of reaction was 6 hours during which 715 parts by weight of chlorine had been introduced.

Upon rectifying the reaction mixture a yield of 867 parts by weight of monochlor-acetic acid, was obtained.

I claim:

1. A process of chlorinating acetic acid which comprises passing both sulfur dioxide and chlorine at the same time into substantially anhydrous acetic acid while a small quantity of a substance capable of promoting the formation of sulphuryl chloride from sulphur dioxide and chlorine by catalytic action is present in the acetic acid.

2. A process in accord with claim 1, which comprises adding a pyridine base as catalyst.

3. An improvement in the process in accord with claim 1, which comprises re-employing the sulfur dioxide coming from the reaction vessel, after being purified.

4. A process in accord with claim 1, which comprises regulating the speeds of introduction of chlorine and sulfur dioxide in such a manner that the gases leaving the reaction mixture contain only a small amount of a substance selected from the group consisting of free sulfur dioxide and chlorine, but contain a substantial amount of sulphuryl chloride, and condensing sulphuryl chloride by cooling the exit gases.

5. A process of forming monochloracetic acid which comprises simultaneously introducing gaseous sulfur dioxide and free gaseous chlorine, into acetic acid which is substantially anhydrous and which contains a fraction of a per cent up to 5% of an organic nitrogen base, intermixed therewith, at substantially above 60° C. but at below the boiling point of the acetic acid.

6. A process of forming monochloracetic acid which comprises introducing a mixture of gases consisting essentially of sulfur dioxide and free chlorine, into acetic acid which is substantially anhydrous and which contains a fraction of a per cent up to 5% of camphor, intermixed therewith, at much above 60° but at below the boiling point of acetic acid.

7. A process of forming monochloracetic acid which comprises introducing a mixture of gases consisting essentially of sulfur dioxide and free chlorine, into acetic acid which is substantially anhydrous and which contains a fraction of a per cent up to 5% of a mercaptan, as a catalyst, intermixed with such acetic acid, at much above 60° C., but at below the boiling point of the acetic acid.

8. A process of forming monochloracetic acid which comprises introducing a mixture of gases consisting essentially of sulfur dioxide and free chlorine, into acetic acid which is substantially anhydrous and which contains a fraction of a per cent up to 5% of an activated carbon, as a catalyst, mixed with such acetic acid, at much above 60° C., but at below the boiling point of the acetic acid.

9. A process of chlorinating acetic acid which comprises passing both sulfur dioxide and chlorine at the same time into substantially anhydrous acetic acid maintained at about 100° C. to about 115° C., during such treatment, and while a small quantity of a substance capable of promoting the formation of sulphuryl chloride from sulfur dioxide and chlorine by catalytic action is present in the acetic acid.

10. A process of chlorinating acetic acid which comprises passing both sulfur dioxide and chlorine at the same time into substantially anhydrous acetic acid while a small quantity of a substance capable of promoting the formation of sulphuryl chloride from sulfur dioxide and chlorine by catalytic action is present in the acetic acid, and thereafter crystallizing out the monochloracetic acid by cooling the reaction mixture for several hours at about 15° C.

11. A process of forming monochloracetic acid which comprises introducing a mixture of gases consisting essentially of sulfur dioxide and free chlorine, into acetic acid which is substantially anhydrous and which contains a fraction of a per cent up to 5% of an organic nitrogen base, intermixed therewith while maintained at between about 100° C. and about 115° C., during such treatment.

12. A process of chlorinating acetic acid which comprises passing both sulphur dioxide and chlorine, simultaneously into substantially anhydrous acetic acid, the amount by volume of chlorine being larger than the amount by volume of sulfur dioxide, while a small quantity of a substance capable of promoting the formation of sulphuryl chloride from sulfur dioxide and chlorine by catalytic action is present in the acetic acid.

13. A process of chlorinating acetic acid which comprises passing both sulfur dioxide and chlorine into substantially anhydrous acetic acid maintained at a temperature substantially above 60° C. but below the boiling point of acetic acid, while a small quantity of a substance capable of promoting the formation of sulphuryl chloride from sulfur dioxide and chlorine by catalytic action is present in the acetic acid.

PIETER LUCAS STEDEHOUDER.

REFERENCES CITED

The following references are of record in the file of this patent:

UNITED STATES PATENTS

| Number | Name | Date |
|---|---|---|
| 2,043,670 | Loder | June 9, 1936 |
| 2,046,090 | Reed | June 30, 1936 |
| 2,168,260 | Heisel et al. | Aug. 1, 1939 |
| 2,302,228 | Kharasch et al. | Nov. 17, 1942 |

FOREIGN PATENTS

| Number | Country | Date |
|---|---|---|
| 157,816 | Germany | Jan. 18, 1905 |
| 6,031 | Great Britain | of 1910 |
| 453,353 | Great Britain | Sept. 4, 1936 |

OTHER REFERENCES

Durrans: Chem. Abstracts, vol. 21, p. 55 (1927).
Kharasch et al.: J. Am. Chem. Soc., vol. 62, pp. 2393-2397 (1940).